(12) United States Patent
Lundberg et al.

(10) Patent No.: US 9,199,382 B2
(45) Date of Patent: Dec. 1, 2015

(54) DAMAGE-PREVENTING SYSTEM FOR MANIPULATOR

(75) Inventors: Ivan Lundberg, Västerås (SE); Roger Mellander, Västerås (SE); Hector Zelaya De La Parra, Västerås (SE); Mats Källman, Västerås (SE)

(73) Assignee: ABB RESEARCH LTD., Zurich (CH)

( * ) Notice: Subject to any disclaimer, the term of this patent is extended or adjusted under 35 U.S.C. 154(b) by 1155 days.

(21) Appl. No.: 13/140,597

(22) PCT Filed: Dec. 17, 2008

(86) PCT No.: PCT/EP2008/067740
§ 371 (c)(1),
(2), (4) Date: Nov. 21, 2011

(87) PCT Pub. No.: WO2010/069369
PCT Pub. Date: Jun. 24, 2010

(65) Prior Publication Data
US 2012/0059516 A1    Mar. 8, 2012

(51) Int. Cl.
*B25J 19/06*    (2006.01)
*B25J 19/00*    (2006.01)

(52) U.S. Cl.
CPC ............... *B25J 19/06* (2013.01); *B25J 19/005* (2013.01)

(58) Field of Classification Search
CPC ........................................... B25J 19/005
See application file for complete search history.

(56) References Cited

U.S. PATENT DOCUMENTS

| | | | |
|---|---|---|---|
| 4,441,854 A | | 4/1984 | Di Matteo et al. |
| 5,200,683 A | * | 4/1993 | Taylor et al. .................. 318/661 |
| 2002/0024320 A1 | * | 2/2002 | Hidaka ........................ 320/135 |
| 2005/0105229 A1 | * | 5/2005 | Deng et al. ..................... 361/90 |
| 2005/0166413 A1 | * | 8/2005 | Crampton ....................... 33/503 |
| 2006/0125448 A1 | * | 6/2006 | Okui ............................ 320/138 |
| 2007/0010898 A1 | * | 1/2007 | Hosek et al. ..................... 700/2 |
| 2008/0116828 A1 | * | 5/2008 | Horikoshi et al. ............ 318/273 |
| 2009/0037768 A1 | * | 2/2009 | Adams ............................ 714/14 |

FOREIGN PATENT DOCUMENTS

| | | |
|---|---|---|
| CN | 1324133 A | 11/2001 |
| DE | 102006057843 A1 | 9/2007 |
| JP | 2002218676 A | 2/2002 |

OTHER PUBLICATIONS

CN 1324133A, Pub. Jul. 30, 2003. Machine generated English Translation of foreign reference provided by Applicant.*
B. Fei, W. S. Ng, S. Chauhan, and C. K. Kwoh, "The safety issues of medical robotics," Reliability Engineering and System Safety, vol. 73, 2001, pp. 183-192.*

(Continued)

*Primary Examiner* — Thomas G Black
*Assistant Examiner* — Peter D Nolan
(74) *Attorney, Agent, or Firm* — Whitmyer IP Group LLC

(57) ABSTRACT

An industrial robot with a manipulator arm including at least one manipulator element and an electric motor driving the at least one manipulator element. An energy reservoir supplies the electric motor with electricity when a power failure or power loss occurs to move the manipulator element from a working position to a safe parking position. Also a method of parking a manipulator arm of an industrial robot.

13 Claims, 1 Drawing Sheet

(56) References Cited

OTHER PUBLICATIONS

G. Duchenim, P. Poignet, E. Dombre, and F. Pierrot, "Medically Safe and Sound," IEEE Robotics & Automation Magazine, 2004, pp. 46-55.*

Chinese Office Action—Issued Jun. 28, 2013 (With Translation)—In Counterpart Application No. 200880132394.9.
PCT/ISA/210—International Search Report—Sep. 17, 2009.
PCT/ISA/237—Written Opinion of the International Searching Authority—Sep. 17, 2009.

* cited by examiner

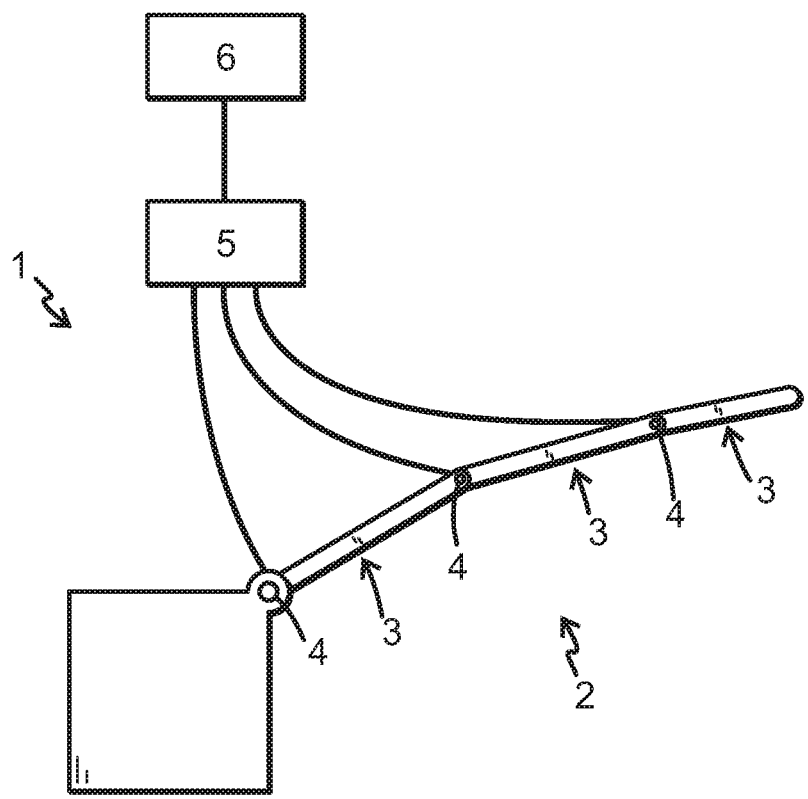

DAMAGE-PREVENTING SYSTEM FOR MANIPULATOR

CROSS-REFERENCE TO RELATED APPLICATIONS

This application is the national phase under 35 U.S.C. §371 of PCT/EP2008/067740 filed 17 Dec. 2008.

TECHNICAL FIELD OF THE INVENTION

The present invention relates to an industrial robot with a manipulator arm comprising at least one manipulator element.

BACKGROUND ART

A manipulator in a robot system losing the electric power is likely to "drop down" when a power failure or loss occur. Therefore some known manipulators are equipped with brakes that brake the movement of the manipulator arm and hold it in a certain position in such instances. For industrial manipulators which often have six or even more arm elements and thereto belonging rotational axes, each provided with a brake, this adds cost, size, weight and mechanical complexity.

Still a system like that is not able to transport the manipulator arm to a safe parking position but at best brakes the arm in a position close to where it is at the time of the power failure or a position determined by how the arm elements are balanced.

A few other solutions to reduce the unwanted effects of a power failure are previously known from and disclosed in the patent literature.

In U.S. Pat. No. 4,441,854 A, e.g., are disclosed three different systems which are used to brake the movement of a manipulator arm joint. No provision for positioning a manipulator arm in a certain position is shown. The movement of the arm is simple dampened or braked when dropping down.

In DE 102006057843 A1 is disclosed a system that uses energy stored in a spring to move a manipulator from a working position to a rest position.

All solutions described in this latter mentioned document involves large mechanical installations which also only provides for the manipulator to move to one predestined position when the loss of electric power occur.

SUMMARY OF THE INVENTION

One aim of the present invention is thus to provide a system of the above-mentioned type that is able to park the manipulator arm in a safe position in case of power failure or loss.

The present invention is thus characterized in an energy reservoir that supplies the electric motor with electricity when a power failure or power loss occurs to move the manipulator element from a working position to a safe parking position.

In a further embodiment of the present invention, the energy reservoir comprises at least one type of batteries, such as lead-acid, nickel-cadmium, nickel-metal hybride or lithium-ion and/or at least one type of capacitors, such as super-caps, double layer or electrostatic.

In a different aspect of the present invention a method of parking a manipulator arm of an industrial robot in case of power failure/loss detected comprises the steps of detecting a power failure, activating a power failure routine or a return to safe parking routine by the detected signal, enabling an energy reservoir to supply energy to transport the manipulator arm to a safe parking position and disabling the energy reservoir by the routine when the parking is performed.

BRIEF DESCRIPTION OF THE DRAWINGS

Other objects characteristics, and advantages of the invention appear on reading the following detailed description of preferred embodiments of the invention, given with specific reference to the accompanying drawings, in which FIG. 1 is an explanatory sketch of a damage-preventing system for a manipulator according to the present invention.

DETAILED DESCRIPTION OF EMBODIMENTS OF THE INVENTION

FIG. 1 thereby discloses a manipulator 1 in an industrial robot system comprising a manipulator arm 2. The arm 2 in turn comprises arm elements 3, in this case three elements. The arm elements are attached to each other by joints 4 having one or more axes of rotation. The relative movements of the arm elements are provided by electrical motors either directly connected to the joints or via gears. The present invention is applicable in both cases. The operation and interaction of the motors is provided by a robot controller 5 which may be programmed with the desired routines directly or by a computer or network.

As previously has been mentioned a manipulator in an industrial robot system requires brakes that hold the manipulator in a certain position in case of absence (or partial loss) of power. For industrial manipulators which often have six or more axes each with a brake this adds cost, size, weight and mechanical complexity as the brakes in themselves are bulky and heavy and the systems also includes brake relays, cables and connectors.

To avoid this, an energy reservoir 6 is applied which in case of a power failure or loss of power provides enough energy to operate the motors to move the manipulator to a safe parking position, regulated by a "power failure" routine from the robot controller 5. The reservoir uses the existing electric infrastructure and there is no need for extra cabling or connectors except the connection of the energy reservoir.

The energy reservoir may comprise at least one type of batteries, such as lead-acid, nickel-cadmium, nickel-metal hybride or lithium-ion and/or at least one type of capacitors, such as super-caps, double layer or electrostatic. An interesting and useable technology in this implementation would be the use of electric double-layer capacitors also known as super capacitors or ultra capacitors (SuperCaps or UltraCaps). Devices of the latter type have a very high energy density when compared to common capacitors. Even faster and with higher energy density still is the EESU which is a recently developed ceramic capacitor that uses barium titanate powders dielectric. No doubt will there be future technologies which provide even more energy efficient means to store energy useable as auxiliary energy sources, e.g. so called bio batteries, where electricity is obtained by breaking down glucose.

The following is a step by step description of the procedure after a power failure (or loss) to transport the manipulator arm to a safe parking position.

1) A power failure is detected (may be defined as e.g. less than 75% of nominal voltage or any other parameter describing a state where the function of the robot system is jeopardized).

2) A power failure routine or a return to safe parking routine is activated by detected signal.

3) The energy reservoir is enabled to supply energy to motor means to transport the manipulator arm to a safe parking position.

4) The energy reservoir is discharged or disabled from supplying energy to said motor means when the parking is performed.

The energy reservoir may be a separate auxiliary energy reservoir used only for this purpose or an energy reservoir already present in the system and used for other purposes as well, but for this application activated and deactivated by the safe parking routine.

Of course, the invention is in no way limited to the embodiment described and shown by way of example only. Modifications are possible, in particular with regard to the construction of the various components or by substituting technical equivalents, without departing from the scope of the protection afforded to the invention.

The invention claimed is:

1. An industrial robot with a manipulator arm, the industrial robot comprising:
   at least one manipulator arm element;
   an electric motor driving the arm element;
   an energy reservoir arranged to supply the electric motor with electricity when a power failure or power loss occurs; and
   a robot controller comprising a power failure or power loss routine activating the energy reservoir to supply the electric motor with electricity and to move the manipulator arm element from a working position to a safe parking position.

2. The industrial robot according to claim 1, wherein the energy reservoir comprises at least one type of battery and/or at least one type of capacitor.

3. The industrial robot according to claim 2, wherein the at least one type of battery comprises lead-acid, nickel-cadmium, nickel-metal hydride or lithium-ion.

4. The industrial robot according to claim 2, wherein the at least one type of capacitor comprises super-caps, double layer or electrostatic.

5. The industrial robot according to claim 2, wherein the power failure or power loss is defined as less than 75% of nominal voltage.

6. The industrial robot according to claim 2, wherein the energy reservoir is used only for moving the manipulator arm element from a working position to a safe parking position.

7. The industrial robot according to claim 1, wherein the energy reservoir is disabled from supplying electricity to the electric motor after the manipulator arm element has been moved to the safe parking position.

8. A method of parking a manipulator arm of an industrial robot in case a power failure/loss is detected, the method comprising:
   detecting a power failure/loss;
   activating a power failure routine or a return to safe parking routine by a detected signal;
   enabling an energy reservoir to supply electric energy to an electric motor to transport the manipulator arm to a safe parking position; and
   disabling the energy reservoir from supplying electric energy to said electric motor when the parking has been performed.

9. The method according to claim 8, wherein the energy reservoir comprises at least one type of battery and/or at least one type of capacitor.

10. The method according to claim 9, wherein the at least one type of battery comprises lead-acid, nickel-cadmium, nickel-metal hydride or lithium-ion.

11. The method according to claim 9, wherein the at least one type of capacitor comprises super-caps, double layer or electrostatic.

12. The method according to claim 8, wherein the power failure/loss is defined as less than 75% of nominal voltage.

13. The method according to claim 8, wherein the energy reservoir is used only for transporting the manipulator arm to a safe parking position.

* * * * *